United States Patent
Tarkoff et al.

(10) Patent No.: US 7,764,775 B2
(45) Date of Patent: Jul. 27, 2010

(54) DISTRIBUTED INTERCOM SYSTEM

(75) Inventors: Daniel M. Tarkoff, Mechanicsburg, PA (US); Donald R. Fletcher, Palmyra, PA (US); Amy J. Hahne, Harrisburg, PA (US); William E. Bruggemeier, Hershey, PA (US); Matthew T. Miller, Hershey, PA (US)

(73) Assignee: ONQ/Legrand, Inc., Middletown, PA (US)

( * ) Notice: Subject to any disclaimer, the term of this patent is extended or adjusted under 35 U.S.C. 154(b) by 1190 days.

(21) Appl. No.: 11/361,398

(22) Filed: Feb. 24, 2006

(65) Prior Publication Data

US 2006/0222153 A1  Oct. 5, 2006

Related U.S. Application Data

(60) Provisional application No. 60/666,380, filed on Mar. 30, 2005.

(51) Int. Cl.
*H04M 1/60* (2006.01)
*H04M 9/00* (2006.01)

(52) U.S. Cl. .............................. 379/167.02; 379/167.04; 379/167.15

(58) Field of Classification Search ................. 379/159, 379/160, 165, 167.02, 167.04, 167.05, 167.07, 379/167.14, 167.15
See application file for complete search history.

(56) References Cited

U.S. PATENT DOCUMENTS

| | | | |
|---|---|---|---|
| 3,728,493 A | 4/1973 | TerVeen | |
| 3,976,847 A | 8/1976 | Bidlack et al. | |
| 4,006,310 A | 2/1977 | Bayer | |
| 4,196,317 A | 4/1980 | Bartelink | |
| 4,485,273 A | 11/1984 | Bartelink | |
| 4,554,411 A | 11/1985 | Armstrong | |
| 4,782,515 A | 11/1988 | Phillips et al. | |
| 5,027,347 A * | 6/1991 | Malkki | 370/270 |
| 5,125,026 A | 6/1992 | Holcombe | |
| 5,131,048 A | 7/1992 | Farenelli et al. | |
| 5,228,078 A | 7/1993 | Bitzman | |
| 5,363,434 A | 11/1994 | Farinelli et al. | |
| 5,369,692 A | 11/1994 | Nowicki | |
| 5,384,838 A | 1/1995 | Hoffman | |
| 5,483,528 A | 1/1996 | Christensen | |
| 5,568,542 A | 10/1996 | Borshchevsky et al. | |
| 5,621,662 A | 4/1997 | Humphries et al. | |
| 5,657,380 A * | 8/1997 | Mozer | 379/88.01 |
| 5,666,428 A | 9/1997 | Farinelli et al. | |

(Continued)

FOREIGN PATENT DOCUMENTS

JP  63222553  9/1988

*Primary Examiner*—Binh K Tieu
(74) *Attorney, Agent, or Firm*—The Webb Law Firm

(57) ABSTRACT

A distributed intercom system including a centralized interconnection unit with a central control device for receiving, processing and transmitting signals, a power distribution device for transmitting a power signal for distribution and at least one cable connection port for receiving a cable connection therein. The system includes a cable with a cable connection element for connection to the cable connection port, and the cable transmits a control signal, a line-level, analog audio signal and the power signal. One or more remote user interface units are connected to and in communication with the centralized interconnection unit through the cable, and the remote user interface unit includes an amplifier, a speaker device and a microphone device. At least one component of the remote user interface unit is powered by the power signal transmitted by the power distribution device.

23 Claims, 14 Drawing Sheets

U.S. PATENT DOCUMENTS

| | | | |
|---|---|---|---|
| 5,784,446 A * | 7/1998 | Stuart | 379/167.11 |
| 5,940,486 A | 8/1999 | Schlaff | |
| 6,058,174 A | 5/2000 | Borshchevsky | |
| 6,539,084 B1 * | 3/2003 | Long | 379/159 |
| 6,549,629 B2 | 4/2003 | Finn et al. | |
| 6,671,360 B2 * | 12/2003 | Sumiya et al. | 379/167.15 |
| 6,760,419 B1 * | 7/2004 | Brown et al. | 379/159 |
| 6,879,670 B2 * | 4/2005 | Shinozaki et al. | 379/167.01 |
| 6,907,458 B2 | 6/2005 | Tomassetti et al. | |
| 2002/0166125 A1 | 11/2002 | Fulmer, II | |
| 2002/0188762 A1 | 12/2002 | Tomassetti et al. | |
| 2003/0061344 A1 | 3/2003 | Monroe | |
| 2003/0062990 A1 | 4/2003 | Schaeffer, Jr. et al. | |
| 2004/0080413 A1 * | 4/2004 | Lee | 340/540 |
| 2005/0267605 A1 * | 12/2005 | Lee et al. | 700/19 |
| 2007/0047712 A1 * | 3/2007 | Gross et al. | 379/167.01 |

* cited by examiner

DISTRIBUTED INTERCOM SYSTEM

CROSS REFERENCE TO RELATED APPLICATIONS

This application claims the benefit of priority from U.S. Provisional Patent Application No. 60/666,380, filed Mar. 30, 2005, which is incorporated herein by reference in its entirety.

BACKGROUND OF THE INVENTION

1. Field of the Invention

The present invention relates generally to intercommunication and audio distribution systems and apparatus for use in both residential and commercial settings and, in particular, to an intercom system that provides distributed line-level, analog audio signals for remote amplification, control functionality at each remote unit, as well as communication between a central control unit, the remote units and other external audio and/or visual systems.

2. Description of the Related Art

Presently, intercom systems are used throughout the world in both residential and commercial settings. These systems allow persons to communicate in remote areas throughout a setting or building using an intercom communications network, as is known in the art. For example, such "intercom" systems are taught in U.S. Pat. No. 6,671,360 to Sumiya et al.; U.S. Pat. No. 6,058,174 to Borshchevsky; U.S. Pat. No. 5,940,486 to Schlaff; U.S. Pat. No. 5,483,528 to Christensen; U.S. Pat. No. 5,384,838 to Hoffman; U.S. Pat. No. 5,369,692 to Nowicki; U.S. Pat. No. 5,228,078 to Blitzmann; U.S. Pat. No. 5,027,347 to Malkki; U.S. Pat. No. 4,782,515 to Phillips et al.; U.S. Pat. No. 4,554,411 to Armstrong; U.S. Pat. No. 4,006,310 to Bayer; and U.S. Pat. No. 3,728,493 to TerVeen. In addition, these prior art intercom systems may provide for the use of a telephone handset in connection with various intercom features. For example, see U.S. Pat. No. 5,125,026 to Holcombe; U.S. Pat. No. 4,485,273 to Bartelink; and U.S. Pat. No. 4,196,317 to Bartelink. However, the presently existing intercom systems have several drawbacks.

Specifically, most current intercom systems require different wiring than telephone or data networks and, further, are connected to or wired to a different area in the house or building. Accordingly, installers must use different wire, and "pull" or install this wire from a different location. In addition, these prior art systems are often bulky and obtrusive. Still further, the remote stations or units must be either powered at the remote unit for use in control functions or, alternatively, act as merely a receiver. For example, most prior art systems will distribute an audio signal over a dedicated line to the speaker at the remote unit, such that the audio signal is weakened and degraded during communication, resulting in a distorted, low-quality sound.

Home automation and whole-house audio distribution systems are available, e.g., U.S. Pat. No. 6,907,458 to Tomassetti et al.; U.S. Pat. No. 5,666,428 to Farinelli et al.; U.S. Pat. No. 5,363,434 to Farinelli et al.; U.S. Pat. No. 5,131,048 to Farinelli et al. and U.S. Publication Nos. 2002/0188762 to Tomassetti et al. and 2003/0061344 to Monroe. These systems are digital-based, computerized systems that act to manage, distribute and control multiple digital signals throughout the audio distribution and control network. Accordingly, these systems are both expensive and intrusive in both the residential and commercial environments. While such home automation systems, which may include an intercom feature, allow for the control of the digital audiovisual signals throughout an enclosed structure, the complexity of installation is matched only by the complex, difficult and time-consuming maintenance of such extensive systems.

In addition, in many of these prior art intercom systems, the control of the functions, such as the control of the remote intercom units, is centralized in the main console or central control unit. Therefore, in order to "turn off" a room, one would be required to walk to the central control unit and activate a switch, or in order to monitor a room, the same would be required. Therefore, the central nature of control in these systems is not distributed, requires a user to continually refer to and manipulate the central controller in order to effect appropriate control over any individual remote unit or zone.

Still further, many prior art systems include central control units that have no indicators of activity at the remote unit locations, e.g., outgoing or incoming calls, such that a user cannot identify and specifically locate certain activities. While selective-call intercom systems exist, such systems are rarely used and are expensive to install and operate. It is particularly beneficial to permit some visual indication as the state of the various components, controls, functions and activities of the central unit, the remote units and/or any other units (or external systems) that are in communication with the system.

Prior art intercom systems are standalone systems that are not integratable with other in-home or building systems, for example, the aforementioned home automation systems. For example, if the doorbell rings and music is playing throughout the home, the music will continue unless someone manually turns the music down or off. Accordingly, these prior art systems have no integration between the intercom system and other systems, such as multi-room audio, telephones and/or other communication systems.

Finally, many prior art systems are difficult to install and require the attachment of an oftentimes unsightly central or remote unit on the wall of the residence or structure. Accordingly, the intercom unit must be attached to the wall, with wires extending in various directions for use in powering the unit and/or providing communication functionality. If the user does not wish the extension of any wires from the unit, a hole must be "punched" in the wall, and the appropriate wiring "pulled" to the location. Therefore, there is a need for an intercom system that is easily attached to or integrated within standard wall openings, to thereby provide a substantially flush-mounted and aesthetically pleasing station or unit.

SUMMARY OF THE INVENTION

Accordingly, it is an object of the present invention to provide a distributed intercom system that addresses the above-identified concerns and overcomes the shortcomings of conventional intercom systems and the like in the communications art. It is another object of the present invention to provide a distributed intercom system that communicates using universal Category-type wiring. It is yet another object of the present invention to provide a distributed intercom system that distributes a line-level, analog audio signal for amplification at each remote unit. It is a further object of the present invention to provide a distributed intercom system that includes distributed control of remote units positioned in remote areas of the house. It is yet another object of the present invention to provide a distributed intercom system that includes a central control unit that provides indications of activity at the remote units. It is a still further object of the present invention to provide a distributed audio system that can be integrated with other installed systems, such as communication and sound systems. It is a further object of the present invention to provide a distributed intercom system that includes units that are easily attached within standard decorator-type openings in a wall.

The present invention is directed to a distributed intercom system. In one embodiment, the distributed intercom system includes a centralized interconnection unit, which includes: a central control device for receiving, processing and transmitting signals; a power distribution device for transmitting a power signal for distribution; and at least one cable connection port for receiving a cable connection therein. At least one cable, which has a cable connection element configured for connection to the cable connection port, is adapted or configured to transmit a control signal, a line-level, analog audio signal and the power signal. At least one remote user interface unit is connected to and in communication with the centralized interconnection unit through the at least one cable. This remote user interface unit includes: an amplifier for amplifying the line-level analog audio signal and providing an amplified audio signal; a speaker device for outputting the amplified audio signal; and a microphone device for receiving audible input and generating an audio input signal. At least one component of the remote user interface unit is powered at the remote user interface unit by the power signal transmitted by the power distribution device of the centralized interconnection unit.

The present invention is further directed to an intercom system having a centralized interconnection unit with a central control device configured to receive, process and transmit signals. At least one remote user interface unit is connected to and in communication with the centralized interconnection unit, and the at least one remote user interface unit includes: an enclosure for housing; a speaker device for outputting an amplified audio signal; and a microphone device for receiving an audio input signal. The enclosure is sized and shaped so as to fit into: (i) a one-gang decorator opening; (ii) a two-gang decorator opening; (iii) a three-gang decorator opening, or any combination thereof.

In a further embodiment, the present invention is directed to a distributed intercom system having a centralized interconnection unit including a central control device for receiving, processing and transmitting signals. At least one remote user interface unit is connected to and in communication with the centralized interconnection unit, and the at least one remote user interface unit includes: a speaker device for outputting an amplified audio signal; a microphone device for receiving audible input and generating an audio input signal; and at least one control interface element. The control interface element permits a user to engage in a distributed control function at the remote user interface unit through interaction with the at least one control interface element.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
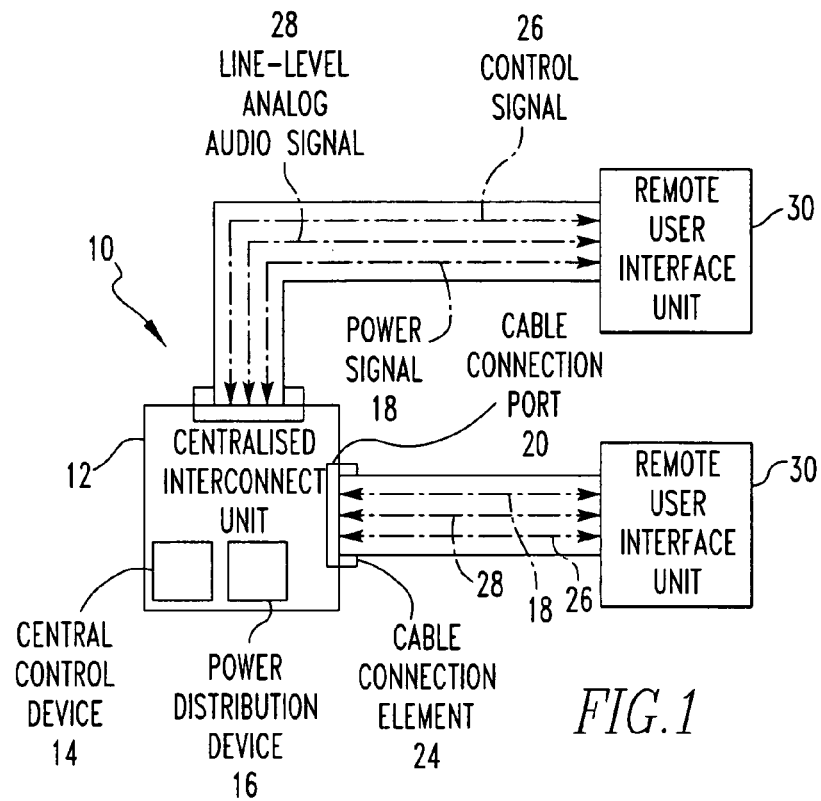
FIG. 1 is a schematic view of one embodiment of a distributed intercom system according to the present invention.
Figure 2:
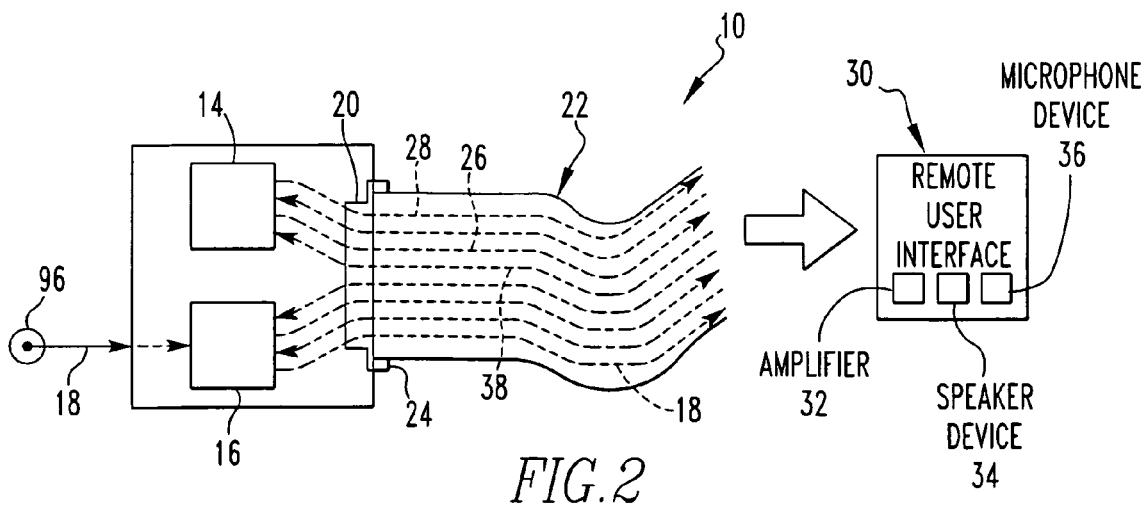
FIG. 2 is a schematic view of a further embodiment of a distributed intercom system according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is a distributed intercom system 10, as illustrated in various embodiments in FIGS. 1, 2 and 5-9. Additionally, preferred and non-limiting embodiments of the various components and subcomponents of the distributed intercom system 10 are illustrated in FIGS. 1-16. As described herein, the distributed intercom system 10 of the present invention can be used in residential and commercial settings. In addition, this system can be used in both existing structures and in connection with existing wiring systems, as well as in connection with new construction and tailored-wire applications.

In one embodiment, the distributed intercom system 10 includes a centralized interconnection unit 12. The centralized interconnection unit 12 includes a central control device 14, which is programmed or configured to receive, process and transmit signals. Accordingly, the central control device 14 of the centralized interconnection unit 12 allows for the appropriate processing and distribution of signals throughout the system 10, and also serves as a "switchboard" for communications through the system 10. The central control device may be in the form of a printed circuit board, circuitry, firmware, hardware, programmed media and the like.

The centralized interconnection unit 12 includes a power distribution device 16, which transmits a power signal 18 for distribution throughout the system 10. Still further, the centralized interconnection unit 12 includes multiple cable connection ports 20 for accepting a cable connection therein and facilitating communication, as well as distribution and transmission, of the signals throughout the system 10 and the various components and subcomponents therein.

The system 10 also includes at least one cable 22 having a cable connection element 24 attached thereto. The cable connection element 24 is adapted and configured for making connection with a respective cable connection port 20 on the centralized interconnection unit 12. In addition, the cable 22 allows for the transmission of a control signal 26, a line-level analog audio signal 28 and the power signal 18 passed from the power distribution device 16. The line-level analog audio signal is preferably in the range of about about 0.1 volt to about 5 volts, peak to peak.

As seen in FIG. 1, the distributed intercom system 10 also includes at least one, and typically multiple, remote user interface units 30. These units 30 are connected to and in communication with the centralized interconnection unit 12 through a respective cable 22 (or multiple cables 22) having a cable connection element 24 connected to a cable connection port 20. Further, the remote user interface unit 30 includes an amplifier 32, which amplifies the line-level analog audio signal 28, thereby providing an amplified audio signal. In addition, the remote user interface unit 30 includes a speaker device 34, which outputs this amplified audio signal.

The remote user interface unit 30 includes a microphone device 36, which receives audible input and transmits an audio input signal 38. In particular, this audio input signal 38 may be passed from the remote user interface unit 30 back through the cable 22 and into the centralized interconnection unit 12 for distribution to the appropriate destination. See FIG. 2. In addition, at least one component of the remote user interface unit 30 is powered at the remote user interface unit 30 by the power signal 18 transmitted by the power distribution device 16 of the centralized interconnection unit 12. For example, the power signal 18 may be utilized to provide current to the amplifier 32, the speaker device 34, the microphone device 36, etc.

The centralized interconnection unit 12 provides for the ability to facilitate appropriate communication amongst the components of the distributed intercom system 10. In addition, the centralized interconnection unit 12 manages the broadcast of the line-level analog audio signal 28, such as a line-level mono voice and audio signal input from any of the remote user interface units 30, and further these signals are distributed throughout the system 10 to the appropriate destinations, such as another remote user interface unit 30 or other external system. In addition, using the power distribution device 16, a low-voltage operational power signal 18 is distributed to the remote user interface units 30, and additionally, using the cable 22, the centralized interconnection unit 12 is capable of collecting, managing, processing and even displaying the operational status for all connected remote user interface units 30.

In one preferred and non-limiting embodiment, the centralized interconnection unit 12 includes sixteen cable connection ports 20 (or connector interfaces) for accommodating a cable connection element 24 of a respective cable 22. As discussed hereinafter, a portion of these cable connection ports 20 can be used in connection with a cable 22, which is in communication with an external system for other communication, automation or similar systems. Still further, the central control device 14 of the centralized interconnection unit 12 includes the appropriate firmware and microprocessor circuitry for controlling communication across the remote user interface units 30, and may also include configuration selection switches and configurable firmware for the provision of multiple communication system configurations via the cable 22 in connection with the remote user interface units 30 or other external systems or devices.

In one preferred embodiment, the cable 22 is a Category-type cable. For example, the cable 22 may be CAT 3 cable, CAT 5 cable, CAT 5E cable, CAT 6 cable, etc. In one embodiment, CAT 5 cable is used, which is a four twisted-pair cabling arrangement. Such Category-type cabling allows for the appropriate communication of the various signals across the system 10, and is easy to install and arrange. In addition, multiple different signals and data streams can be transmitted through the cable 22 simultaneously, and multiple cables 22 may be in used in connection with a single unit 30. For example, the line-level audio signal 28, the power signal 18, the control signal 26 can be transmitted therethrough. However, a variety of signals can be transmitted through the wires of the cable 22, including control signals, audio signals, video signals, analog signals, digital signals, speaker audio signals, ground signals, power signals, microphone audio signals, microphone mode control signals, door release signals, talk control signals, door control signals, hands-free talk signals, strobe signals, door bell signals, serial command signals, announce signals, mute signals, clock signals etc.

Figure 3:
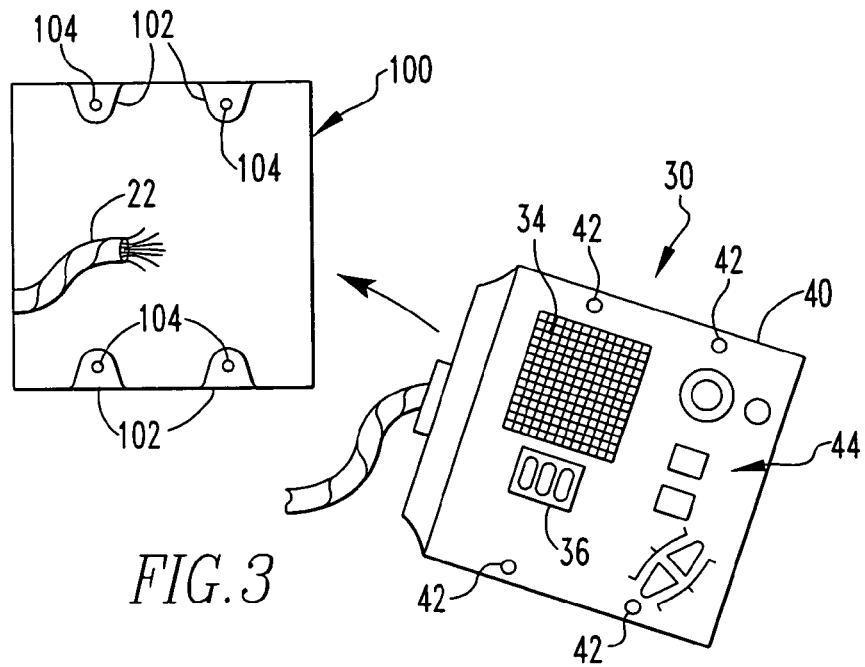
FIG. 3 is a front view of a further embodiment of a distributed intercom system according to the present invention during mounting a remote user interface unit.

As seen in FIG. 3, and in one embodiment, the remote user interface 30 includes an enclosure 40 for at least partially housing the amplifier 32, the speaker device 34 and the microphone device 36. In addition, the enclosure 40 is sized and shaped so as to fit into a standard residential decorator-style opening 100. The standard decorator opening 100 includes one or more commonly available multi-gang electrical wiring boxes, typically referred to as J-boxes. Accordingly, the enclosure 40 of the remote user interface unit 30 can be manufactured to be appropriately attached within a one-gang decorator opening, a two-gang decorator opening, a three-gang decorator opening, etc. Further, the enclosure 40 can be substantially flush-mounted (with respect to the wall) in the decorator opening 100.

In assembly, the enclosure 40 (or remote user interface unit 30) is attached within the decorator opening 100 using a variety of well-known attachment mechanisms and arrangements. For example, as seen in FIG. 3, the decorator opening 100 may include multiple tabs 102, each tab having an orifice 104 extending therethrough. In order to install the enclosure 40, the enclosure 40 is included with orifices 42 (or orifices 42 on corresponding tabs attached to the enclosure 40), which align with the orifices 104 of the tabs 102. In this manner, any known attachment mechanism, such as a screw or the like, can be inserted through the orifices 42, 104, and effectively attach the remote user interface unit 30 within the decorator opening 100. This provides for a wall-mounted unit 30. Of course, outdoor units 30, such as door units and patio units, may be attached or mounted directly on an outside wall surface using screws or other similar attachment mechanisms and arrangements.

In order to provide interaction between the components of the distributed intercom system 10, and in one preferred and non-limiting embodiment, the remote user interface 30 includes at least one, and typically multiple, control interface elements 44. These elements 44 permit a user to engage in the distributed control functions at the remote user interface unit 30 through interaction with the element 44. As is known in the art, the control interface element 44 can be in the form of a push-button, a rheostat device, a toggle, a switch, a joystick, or some other device or member that allows for the tactile input by the user.

In addition, a variety of distributed control functions are envisioned. For example, the function may be a monitor function, a mute function, a selective-call function, a broadcast function, a telephone answering function, a call function, a call function across a network, a call function to another remote user interface unit 30, a call function to the centralized interconnection unit 12, a call function to another centralized interconnection unit 12, a door activation function, a volume control function, a hands-free talk function, a call to a centralized control unit 46, etc.

For example, the control interface element 44 may be a "talk" button, which activates the microphone device 36 (and corresponding microphone circuitry), directing audio input signals 38 to the centralized interconnection unit 12 for a system-wide broadcast to all connected remote user interface units 30. It is envisioned that such a "broadcast" function may neglect any connected door units, as discussed hereinafter. Another control interface element 44 may be labeled "door", and activate the microphone device 36 and/or microphone circuitry for directing audio to the centralized interconnection unit 12 for system-wide broadcast to all remote user interface units 30, as well as the release of a door or other entryway associated with a particular remote user interface unit 30.

A "mute" control interface element 44 or button may disable all speaker device 34 broadcasts and microphone device 36 reception at the location of the remote user interface unit 30, until the "mute" element 44 is again depressed. Activation of a "monitor" control interface element 44 may activate the microphone device 36 reception at the location, until the "monitor" element 44 is again depressed. In another embodiment, by depressing both the "talk" control interface element 44 and the "door" control interface element 44, a signal is directed to the centralized interconnection unit 12, as well as to the appropriate external system to energize a control circuit for driving the time-controlled management of external door release systems.

Figure 4:
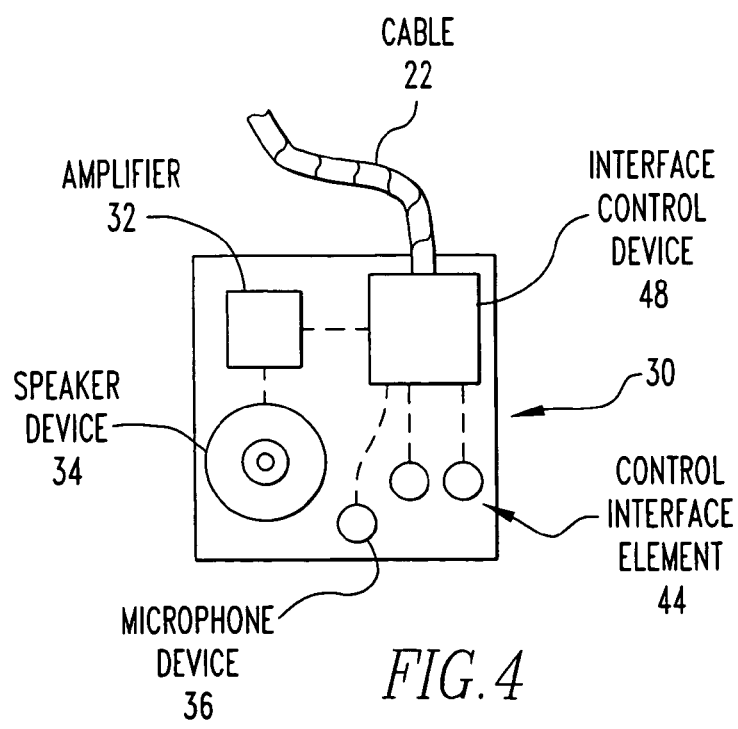
FIG. 4 is a schematic view of another embodiment of a remote user interface unit of a distributed intercom system according to the present invention.

As seen in FIG. 4, one or more of the remote user interface units 30 may include an interface control device 48 for interacting with and facilitating communication and signal delivery from the remote user interface unit 30 to another remote user interface unit 30 through the centralized interconnection unit 12. For example, this interface control device 48 may be in communication with the amplifier 32, the speaker device 34, the microphone device 36, the control interface elements 44, etc.

As discussed above in connection with the remote user interface unit 30, it is also envisioned that the centralized interconnection unit 12 includes one or more control interface elements 44 that permit a user to engage in a control function at the centralized interconnection unit 12 through interaction therewith. Again, the control interface element 44 may be a button, a switch, toggle or the like, and allow for some control over some or all of the components and units 30 of the distributed intercom system 10.

Figure 5:
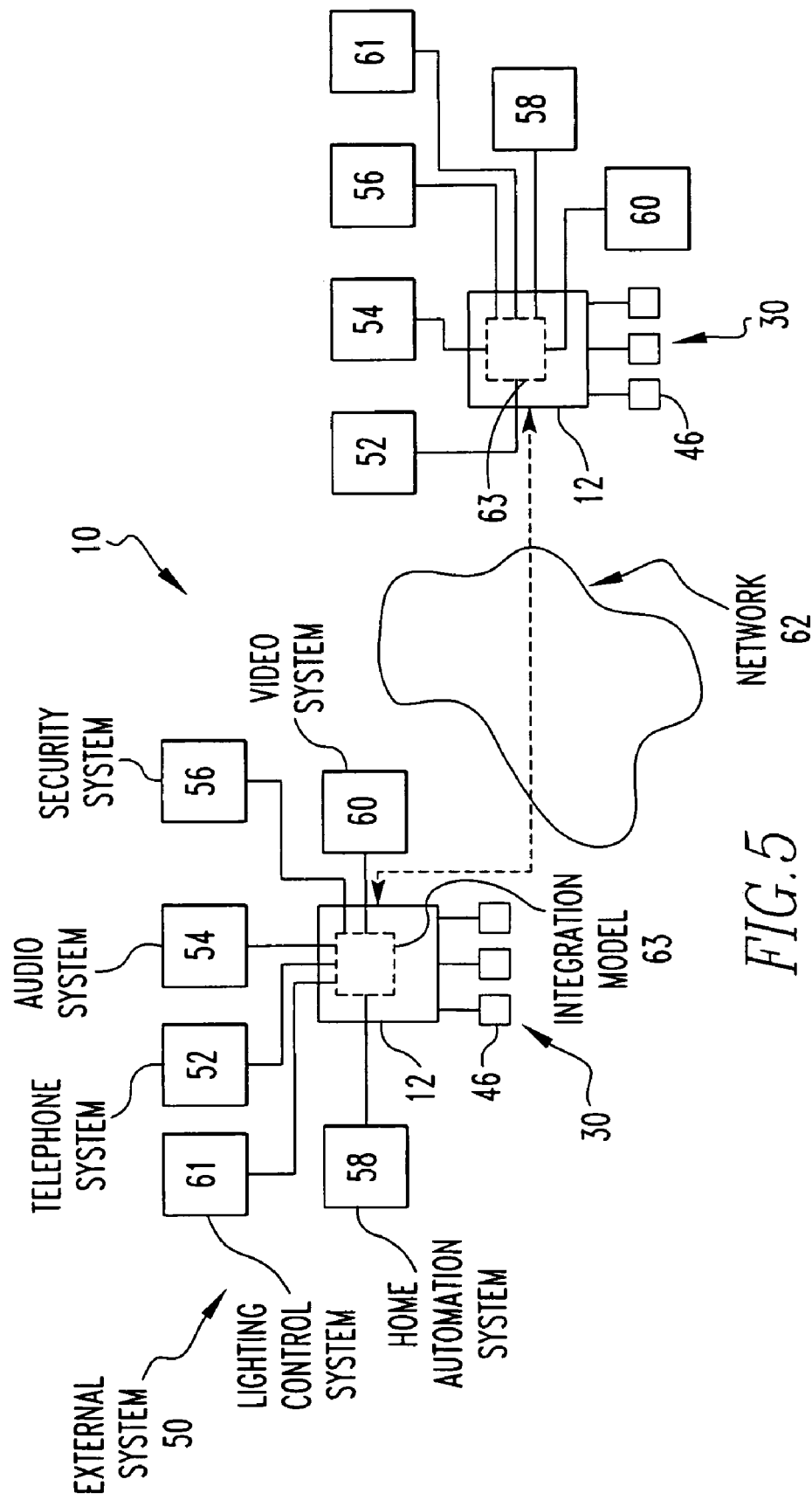
FIG. 5 is a schematic view of another embodiment of a distributed intercom system according to the present invention.

One benefit of the distributed intercom system 10 of the present invention is its ability to interact with various other external systems 50. In this regard, the centralized interconnection unit 12 may include an appropriate cable connection port 20 for facilitating communication between the distributed intercom system 10 and the external system 50 through a respective cable or cables 22. Any number of external systems 50 is envisioned. For example, the external system 50 may be a telephone system 52, an audio system 54, a security system 56, a home automation system 58, a video system 60, a lighting control system, etc. These various external systems 50 may be in communication directly or indirectly with the centralized interconnection unit 12. In one embodiment, and as shown in FIG. 5, the external systems 50 may be in communication with an integration module 63, which is in communication with the centralized interconnection unit 12. For example, the integration module 63 may be connected to the centralized interconnection unit 12 via a receiving port or other data communication connection. This integration module 63 can be configured to provide for the control and communication between the external systems 50 and the centralized interconnection unit 12.

In addition, and as illustrated in FIG. 5, the centralized interconnection unit 12, the integration module 63 and/or the various external systems 50 and remote user interface units 30, can be in communication with a further off-site distributed intercom system 10, for example over a network 62. This communication can be in a wireless format, however, such communication may also be facilitated through a landline, a cable, existing wiring, telephone wiring, etc. Accordingly, various distributed intercom systems 10 could be in communication with each other and allow for the interaction by a user from an off-site external system 50 to a home centralized interconnection unit 12, distributed intercom system 10 and/or local external system 50. Further, the external system 50 may be a personal computer or other computerized device, which would provide additional control features to the distributed intercom system 10, and may also provide a visual control and management system for the system 10.

As discussed above, the primary communication between the centralized interconnection unit 12 and each remote user interface unit 30 is the respective cable 22. In this regard, the cable connection ports 20 allow for the appropriate connection of the cable connection element 24 positioned on a cable 22, which is in communication with a respective remote user interface unit 30, external system 50 or other device or component. For example, in one embodiment, the cable 22 is Category-type cable, and the cable connection element 24 allows for the quick connection via standard telephone-style termination connectors, eight-position punch-down (insulation displacement) style connectors and/or eight-position modular jacks. Therefore, communications throughout the distributed intercom system 10 can be facilitated through a variety of wiring solutions.

Figure 6:
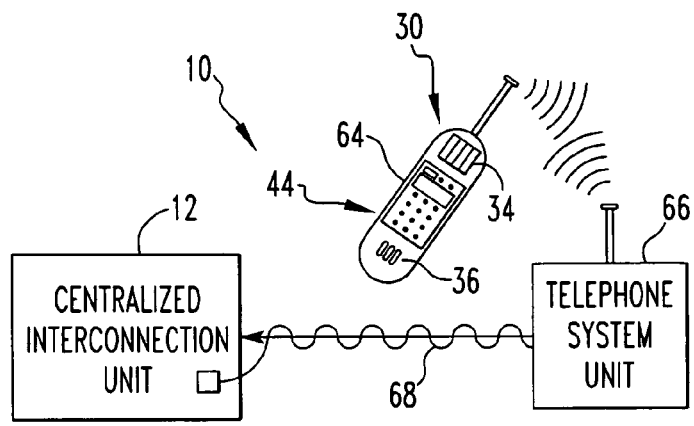
FIG. 6 is a schematic view of a still further embodiment of a distributed intercom system according to the present invention.

As seen in FIG. 6, and in one preferred and non-limiting embodiment, the remote user interface unit 30 is a telephone handset 64, for example a handheld, wireless handset. Such a wireless telephone handset 64 would be in communication with a telephone system unit 66, which would be in communication with the centralized interconnection device 12 via the existing telephone wiring 68. Therefore, when provided with the appropriate support module and functionality, the centralized interconnection unit 12 could allow for the connection and communication with a telephone handset 64 through the household telephone wiring 68. In effect, such an embodiment would provide a movable or portable remote user interface unit 30. Accordingly, a user could use the above-discussed "monitor", "mute", "answer", "selective-call", "door activation", etc. functions directly from the telephone handset 64, where the buttons of the telephone handset 64 acted as the above-discussed control interface elements 44.

Figure 7:
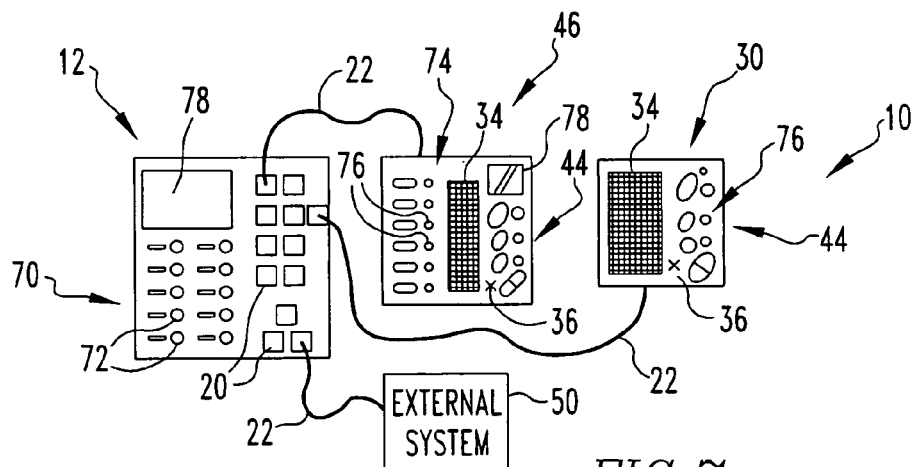
FIG. 7 is a schematic view of yet another embodiment of a distributed intercom system according to the present invention.

As seen in FIG. 7, and in another embodiment, the centralized interconnection unit 12 includes a display portion 70, which includes multiple status indicators 72, visually, audibly, or tactilely indicating the status or state of various other components. For example, the status indicator 72 could visually display the status of the remote user interface 30, the status of the centralized interconnection unit 12, the function of the remote user interface unit 30, a function of the centralized interconnection unit 12, a state of the remote user interface unit 30, a state of the centralized interconnection unit 12, a status of an external system 50, a function of the external system 50, a state of the external system 50, etc. In addition, each status indicator 72 may be labeled and the user provided with the ability to modify and/or assign the "name" of the status indicator 72.

Also illustrated in FIG. 7 is a similar embodiment with respect to the central control unit 46 and/or remote user interface units 30. In particular, the central control unit 46 and/or remote user interface units 30 may include a display portion 74 and multiple status indicators 76, as discussed above. Therefore, the status indicator 76 may visually display the status of the remote user interface unit 30, the central control unit 46, another remote user interface unit 30, and/or a status, function or state of other components in the system. In addition, the display portion 74 may include an area for a label, such that the status indicator 76 could be associated with a particular remote user interface unit 30, etc. and/or zone in the system 10. For example, these labels could be in the form of insertable tabs, erasable substrate, programmable display, etc. It is envisioned that the central control unit 46 would be a single unit centrally located, and this unit 46 would include the display portion 74 and status indicators 76 discussed above.

The status indicator 76 may take many forms. For example, in one embodiment, the status indicators 76 are LEDs, which may use various colors to indicate the state, status or function of a component in the system 10. However, it is also envisioned that the status indicator 76 be in the form of a display screen 78, such as an LCD display or the like. In addition, the display screen 78 may be a touch-screen, which allows the display screen 78 to be used as a control interface element 44. In addition, the provision of such control and information may be localized at a single central control unit 46, such as a remote user interface unit 30 positioned in a kitchen or other central location in the household. In addition, the central control unit 46 may include appropriate control circuitry and configurable firmware for allowing for the programmable control of the system 10, the centralized interconnection unit 12, the remote user interface unit 30, the central control unit 46, etc. In this manner, the status indicators 76 and/or display screen 78, coupled with the control interface elements 44 (such as a keypad or the like) provide the user control and visible local control response indication. In addition, these control interface elements 44 may be in the form of a keypad interface, and the keypad may include a user-selectable backlit keypad brightness.

Accordingly, the centralized interconnection unit 12, the remote user interface unit 30 and/or the central control unit 46 may include enhanced and distributed control features and functionality for interaction with other components of the system 10, as well as other external systems 50. For example, in one embodiment, the central control unit 46 and/or the remote user interface unit 30 include the following control interface elements 44: (1) "talk", "door", "talk hands-free", "door release" and "volume control". As discussed above, the "talk" button would activate the circuitry associated with the microphone device 36 and direct audio input signals 38 to the centralized interconnection unit 12 for a system-wide broadcast to all connected or selected remote user interface units 30, preferably not including units 30 that are positioned at outside locations, such as at the door or on the patio. The "door" button may activate the circuitry of the microphone device 36 and direct audio input signals 38 through the centralized interconnection unit 12 for a system-wide broadcast to all units 30, and release of the "door" button initiates or activates the microphone device 36 of the unit 30 at the door for time-controlled reception and delivery of all audio to the other units 30. Depressing the "talk hands-free" button initially activates the circuitry of the microphone device 36 and directs audio input signals 38 through the centralized interconnection unit 12 for a system-wide broadcast to all connected or selected units 30, and upon release thereof, directs a time-controlled activation of the microphone devices 36 for all connected or selected units 30. In addition, as discussed above, the "door release" button directs or provides for the energization of a control circuit that drives the time-controlled management of external door release systems, such as those that are part of a security system 56 or the like.

Figure 8:
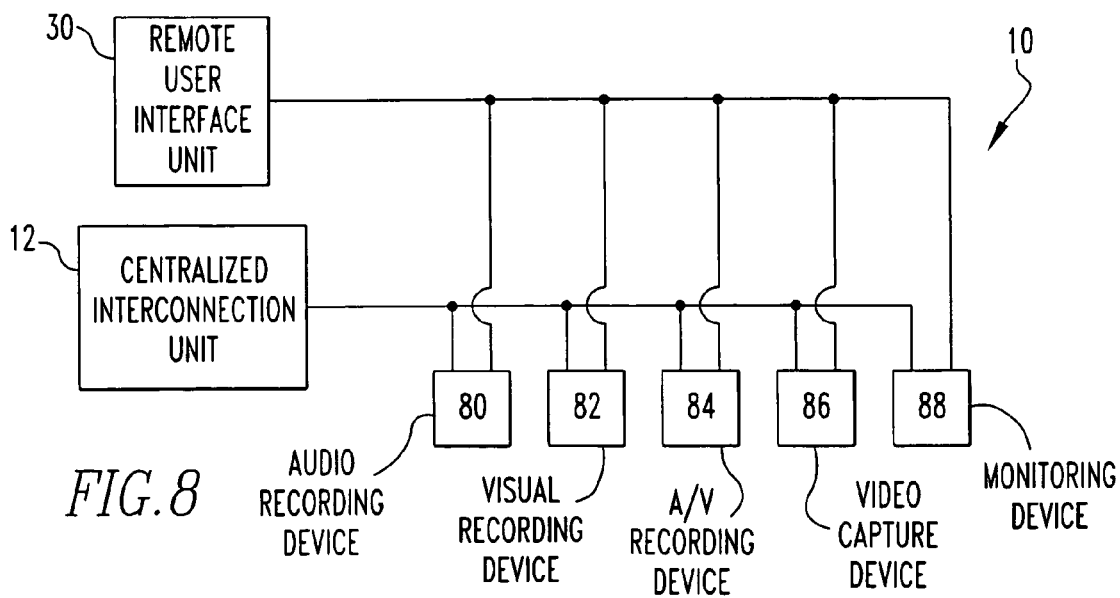
FIG. 8 is a schematic view of a further embodiment of a distributed intercom system according to the present invention.

One unique advantage of the distributed intercom system 10 of the present invention is the ability to interact with and communicate with the various external systems 50, as discussed above. In addition, one or more of the remote user interface units 30 may include various local systems and devices to assist in information and data gathering and communication. For example, as seen in FIG. 8, the remote user interface unit 30 (whether or not the central control unit 46), as well as the centralized interconnection unit 12, may be in communication with an audio recording device 80, a visual recording device 82, an audio/visual recording device 84, a video capture device 86, a monitoring device 88, etc. For example, the audio recording device 80 may be a recorder (whether analog or digital), that allows messages to be stored and communicated within the distributed intercom system 10. Therefore, the remote user interface units 30 (or the centralized interconnection unit 12) can be used as a device to store notes, comments or, in the case of placement at a door unit, record a message from a third party outside of the house.

Similarly, a visual recording device 82 or audio/visual recording device 84, such as in the form of a video camera or the like, can be placed in various locations either directly or indirectly associated with a remote user interface unit 30 or centralized interconnection unit 12. The video capture device 86 may be a camera that takes pictures of various locations for storage within the system 10. For example, again in association with the door unit, the video capture device 86 could obtain a picture of the person interacting with the unit 30 or interacting with the control interface elements 44 of the unit 30. These devices may be in hardwired or wireless communication with the remote user interface unit 30 and/or centralized interconnection unit 12.

Oftentimes, it is also useful to gather local environmental data at one or more of the remote user interface units 30. In this example, the monitoring device 88 could be a temperature monitoring device, a weather monitoring device, a state monitoring device, etc. Therefore, and due to the distributed nature of the system 10, a person could obtain appropriate temperature, weather or state information and data from, for example, a door unit by communicating with any of the units 30 in the system 10. It is envisioned that any number of environmental and physical state conditions can be monitored at the remote user interface unit 30 and/or centralized interconnection unit 12.

The use of the audio recording device 80, visual recording device 82, audio/visual recording device 84, video capture device 86 and monitoring device 88 provides additional security functionality to either the distributed intercom system 10 or an associated external system 50, such as a security system for the household or commercial setting. As with the remote user interface unit 30 and/or the centralized interconnection unit 12, the data obtained from the various devices and systems discussed above can be transferred over the cable 22 and distributed appropriately by the centralized interconnection unit 12.

Figure 9:
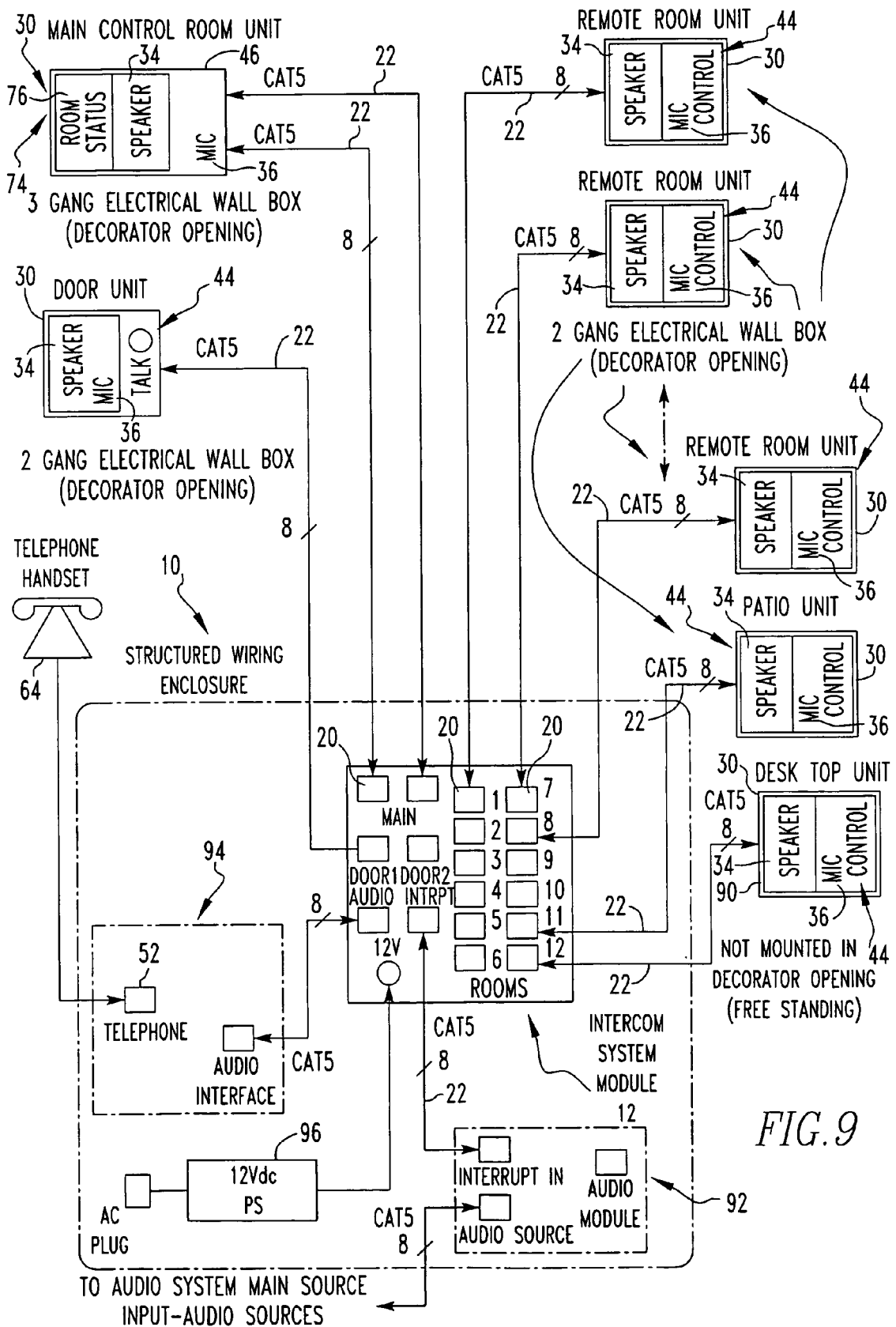
FIG. 9 is a schematic view of a still further embodiment of a distributed intercom system according to the present invention.

FIG. 9 illustrates one preferred and non-limiting embodiment of the distributed intercom system 10 according to the present invention. As seen in this figure, this embodiment of the system 10 includes multiple remote user interface units 30 positioned in various rooms or zones, as well as an outdoor or patio unit. Each of these units 30 are configured to fit in a two-gang decorator opening 100. Furthermore, a standalone unit 90 or "desktop" unit is also used as a remote user interface unit 30 in the system 10. The standalone unit 90 is not mounted in a decorator opening 100, instead providing a free-standing, portable unit that can be positioned on a substantially horizontal surface, such as a desktop, table, counter or the like. In this embodiment, a main central control unit 46 is provided and sized and shaped so as to fit into a three-gang decorator opening 100. Further, in this embodiment, two cables 22 provide communication and signal transmission between the central control unit 46 and the centralized interconnection unit 12.

In addition, this arrangement includes an audio interrupt module 92, which is in communication with the centralized interconnection unit 12, such as by direct physical interaction, a cable 22 or the like. In this embodiment, the audio interrupt module 92 includes an audio source component that is in communication with a main audio system, such as a stereo, audio/visual system, DVD player, television, etc. In addition, the audio interrupt module 92 includes an interrupt connection that is in direct communication with the centralized interconnection unit 12. In operation, the audio interrupt module 92 allows for the interruption of the main audio source, such as the stereo, when the intercom system 10, or some specific component of the intercom system 10, such as a specified remote user interface unit 30, is in use. For example, the audio interrupt module 92 may allow for the muting of various audio or audio/visual sources and components if, for example, the door remote user interface unit 30 is activated. Therefore, the user will not miss any activation or interaction with the door unit 30, which typically indicates a visitor or other person requesting entry.

As also seen in FIG. 9, the distributed intercom system 10 may include an automation module 94, which, like the audio interrupt module 92, is in direct or indirect contact or communication with the centralized interconnection unit 12. As discussed above, this automation module 94 may provide for the communication between the distributed intercom system 10 and various other external systems 50, such as the telephone system 52, the audio system 54, the security system 56, the home automation system 58, the video system 60, the network 62, etc. In the embodiment of FIG. 9, this automation module 94 provides for communication with the internal telephone system 52.

In this embodiment, a power source 96 is illustrated. Specifically, a 12-volt power source 96, in the form of an AC plug, provides power to the centralized interconnection unit 12. In addition, this power source 96 is in communication with and directs the power signal 18 to the power distribution device 16, or may act directly as the power distribution device 16. In any case, it is this power source 96 that eventually provides power to the remote user interface units 30 in those embodiments that require distributed power over the intercom system 10. It is envisioned that the power source 96 may be a low-voltage power source, a 12-volt power source, a 24-volt power source, etc.

Figure 10A:
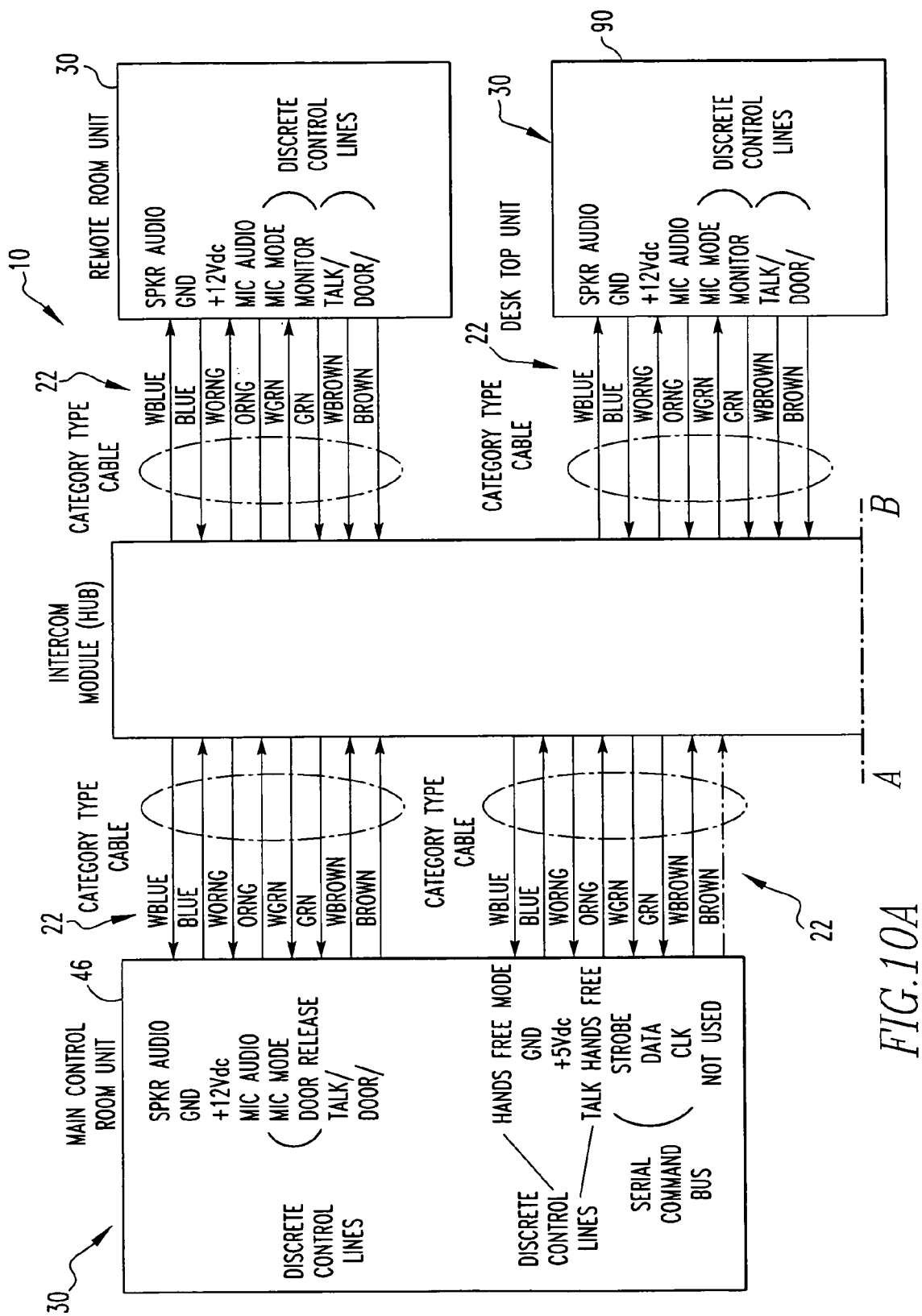
FIG. 10 is a schematic view of a cabling and signal flow diagram of the distributed intercom system of FIG. 9.
Figure 10B:
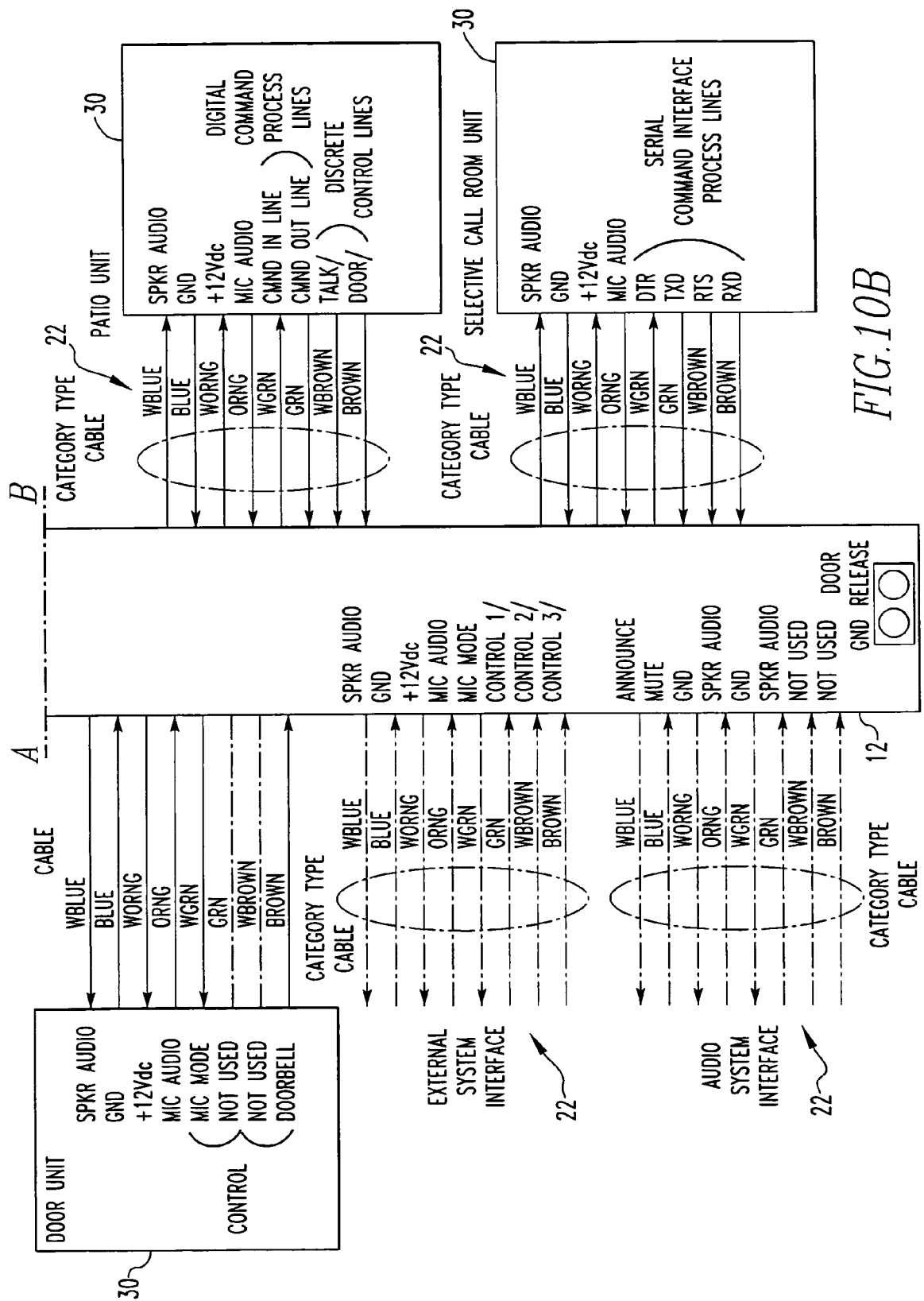

FIG. 10 illustrates the signal transmission diagram for the arrangement and embodiment of FIG. 9. In addition, in this embodiment, CAT 5 cabling is used, such that each cable 22 includes four twisted-pairs of wires. In particular, this diagram shows how the various data signals are transmitted (i.e., to and/or from the units 30 or external systems 50) through the cables 22 to each remote user interface unit 30 and/or external system 50. In this embodiment, and as discussed above, two cables 22 are used in connection with the central control unit 46. The signals transmitted through the wires of the cables 22 include a speaker audio signal, two ground signals, two power signals 18, a microphone audio signal, a microphone mode control signal, a door release signal, a talk signal, a door signal, a hands-free audio signal, a talk hands-free signal, a strobe signal, a data signal and a clock signal.

In this embodiment, the cable 22 used in connection with the door unit 30 provides for the transmission of a speaker audio signal, a ground signal, the power signal 18, a microphone audio signal, a microphone mode control signal and a doorbell signal. The cable 22 used in connection with each remote room unit 30, as well as the standalone unit 90, provides for the transmission of a speaker audio signal, a ground signal, the power signal 18, a microphone audio signal, a microphone mode control signal, a monitor signal, a talk signal and a door signal. The patio unit 30 includes a cable 22 that provides for the transmission of a speaker audio signal, a ground signal, the power signal 18, a command in line signal, a command out line signal, a talk signal and a door signal. Further, a selective call unit 30 includes a cable 22 for the transmission of a speaker audio signal, a ground signal, the power signal 18, a microphone audio signal, a data terminal ready signal, a transmit data signal, a request to send signal and a receive data signal.

The centralized interconnection unit 12 also includes connections to the above-discussed audio interrupt module 92 and the automation module 94. The automation module 94 (which acts as the external system 50 interface) includes cable 22 providing for the transmission of a speaker audio signal, a ground signal, a microphone audio signal, a microphone mode control signal and three external system 50 control signals. Finally, the audio interrupt module 92 (which acts as the audio system 54 interface) includes cable 22 for the transmission of an announce signal, a mute signal, two ground signals and two speaker audio signals.

The Category-type cable 22 that extends between the centralized interconnection unit 12 and each remote unit 30 and/or external system 50 varies. For example, the remote user interface units 30 (other than the central control unit 46) use the available eight wires as necessary to accommodate the specific level of control required to provide the desired system 10 functionality. The central control unit 46 uses two cable 22 connections. Some interfaces use only discrete control lines, some are serial protocol-based and others are a hybrid cross with both serial and discrete lines. Accordingly, the centralized interconnection unit 12 utilizes a variety of Category-type cable 22 variations and arrangements.

The speaker audio signal routed from the centralized interconnection unit 12 may be used for the potential "broadcast" over the remote user interface units 30 and/or some external system 50. Further, the microphone audio signal is the audio signal that has been entered into the distributed intercom system 10 by either a remote user interface unit 30 (via the activated microphone circuitry) and/or an external system 50. In one embodiment, the control lines, as well as the speaker and microphone audio lines, are arranged in a star pattern to and from the remote user interface units 30 from the centralized interconnection unit 12. The centralized interconnection unit (i.e., the central control device 14) makes decisions regarding which remote user interface units 30 will receive audio signals to broadcast via the speaker device 34, as well as which units 30 are provided with the opportunity to place audio "in" on the microphone audio line via the microphone device 36. The centralized interconnection unit 12 affects this control through the continuous decoding of the various remote user interface unit 30 control signals.

It should also be noted that the centralized interconnection unit 12, the remote user interface unit 30 or some other component in the system may include the appropriate radio frequency filter circuitry to substantially eliminate electromagnetic field coupling from the various radio frequency transmitters. Accordingly, the appropriate audio sensing and delay circuitry may be included for recognition and passing of the desired broadcast of line-level analog audio signals 28, but preventing unwanted coupling of electromagnetic field interference generated by electronic home devices, such as ceiling mounted fans, heating and cooling system fan motors, etc.

As discussed above, the remote user interface unit 30 may be in the form of a door unit that is attached to an outside location of the house, or attached in a two-gang or three-gang decorator opening 100. In one embodiment, the control interface element 44 at this door unit 30 is a button that announces presence at the unit 30. For example, this button may direct a polyphonic audio source for system-wide broadcast to all connected remote user interface units 30 and/or the centralized interconnection unit 12. In addition, the polyphonic audio source, such as a doorbell sound or the like, may be prevented from emanating from other door units. The functionality associated with the door unit may be provided as a modular daughter card add-on module to the centralized interconnection unit 12, and may support multiple alert signals announcing activity at any connected door unit. Still further, it is envisioned that such a door unit may be weatherproofed or otherwise shielded from the environmental impact. Similarly, an outdoor unit could be in the form of a patio unit and could either be mounted on the side of the house or structure, or possibly placed within a two-gang or three-gang decorator opening 100. This patio unit may include many of the functions discussed above, such as "talk", "door", "mute", "monitor", "volume control", etc.

Figure 11:
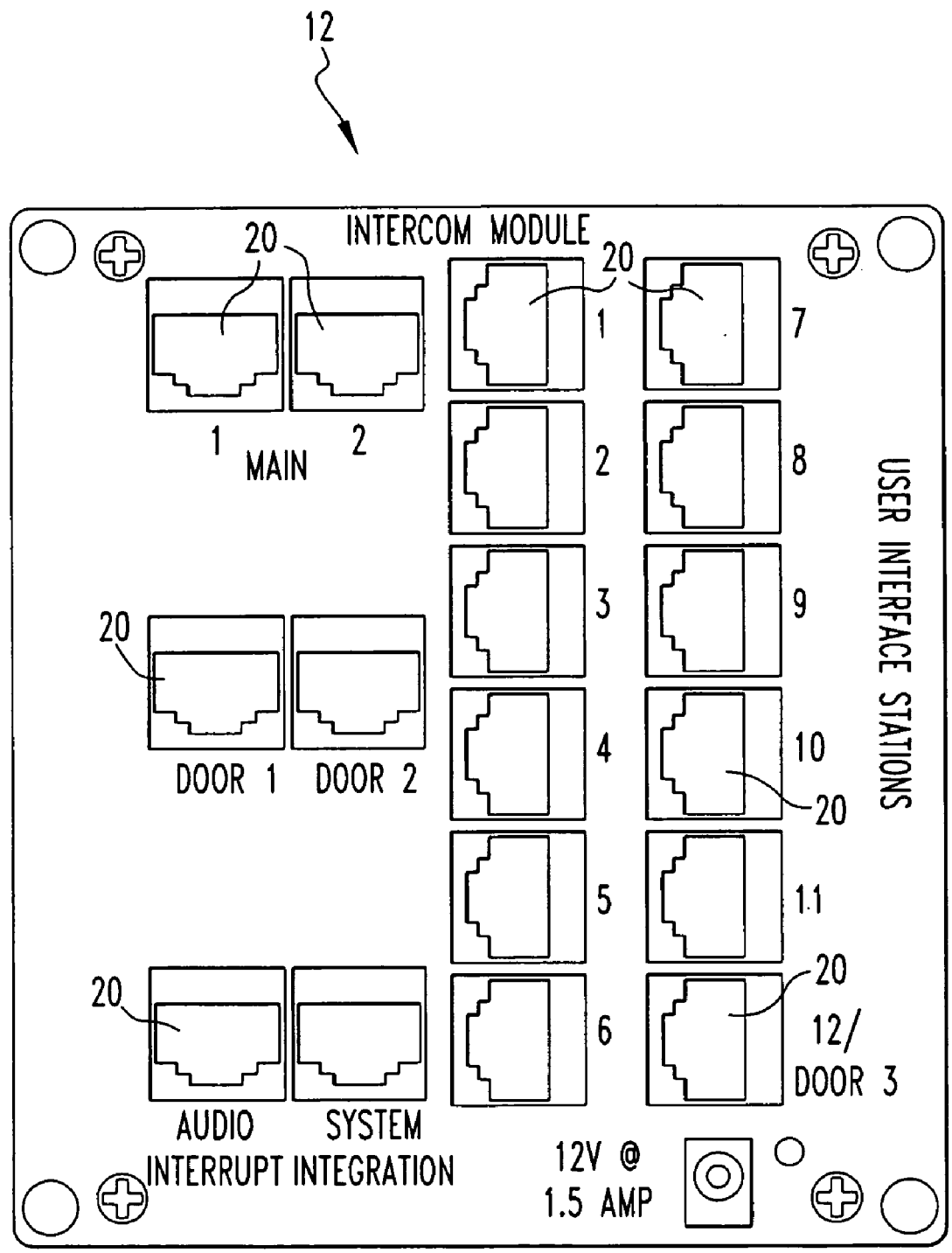
FIG. 11 is a front view of a centralized interconnection unit of a distributed intercom system according to the present invention.

FIGS. 11-17 illustrate various preferred and non-limiting structures of the components of certain preferred embodiments of the distributed intercom system 10. For example, FIG. 11 illustrates a preferred structure of the centralized interconnection unit 12, including two cable connection ports 20 for communication with the central control unit 46, two cable connection ports 20 for communication with two door unit remote user interface units 30, twelve cable connection ports 20 for use in connection with various room or zone remote user interface units 30, one cable connection port 20 for use in connection with the above-discussed audio interrupt module 92, and one cable connection port 20 for use in connection with the above-discussed automation module 94. In addition, the centralized interconnection unit 12 includes an appropriate port or connection for use with the power source 96.

Figure 12:
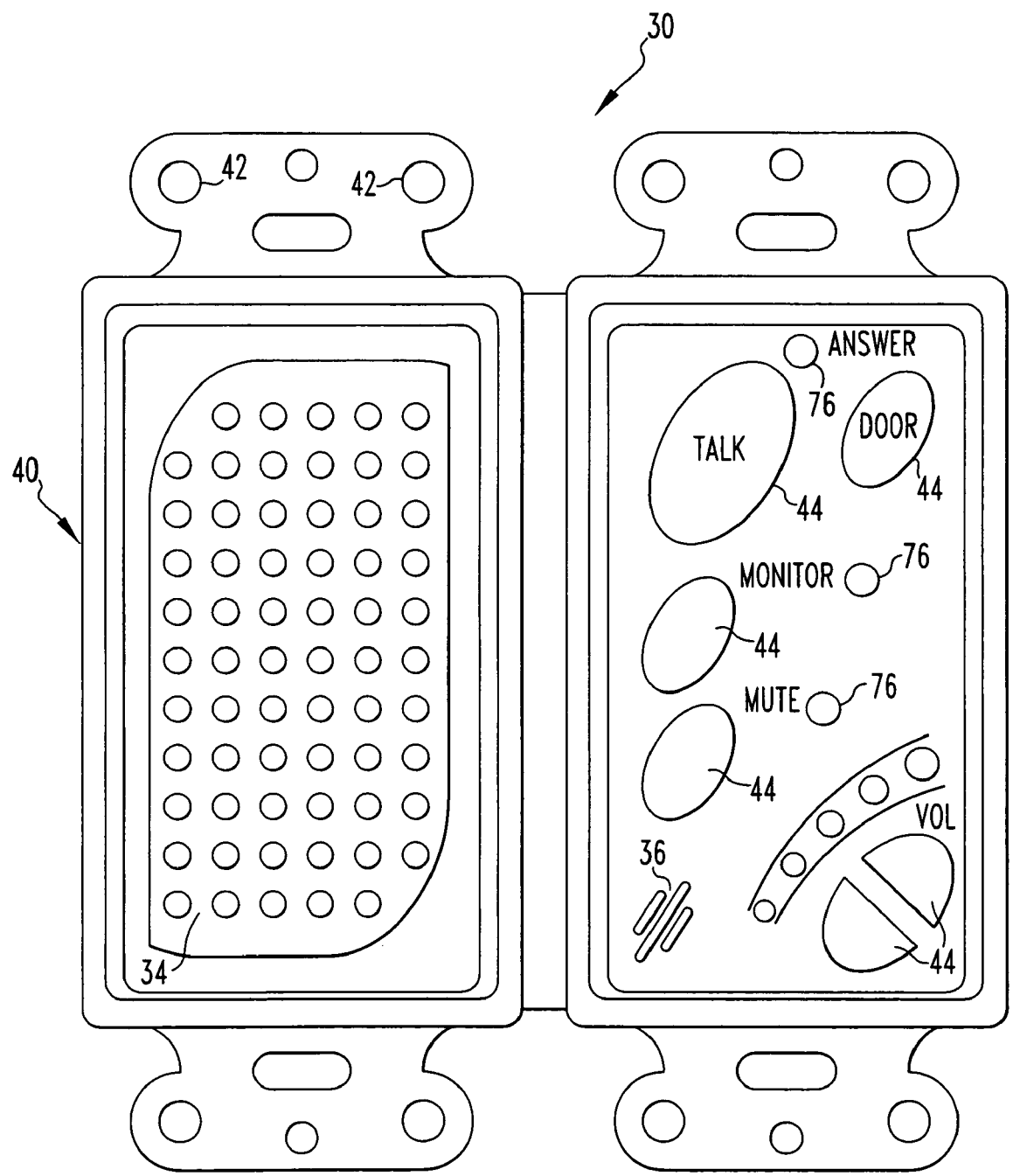
FIG. 12 is a front view of a remote user interface unit of a distributed intercom system according to the present invention.

FIG. 12 illustrates a preferred embodiment of a room remote user interface unit 30. This unit 30 fits within a two-gang decorator opening 100, and as illustrated, includes the appropriate orifices 42 for connection within the opening 100. In addition, this remote user interface unit 30 illustrates the preferred placement of the speaker device 34, microphone device 36, control interface elements 44 and status indicators 76, and demonstrates the functionality associated with "talk", "door", "monitor", "mute", and "volume control".

Figure 13:
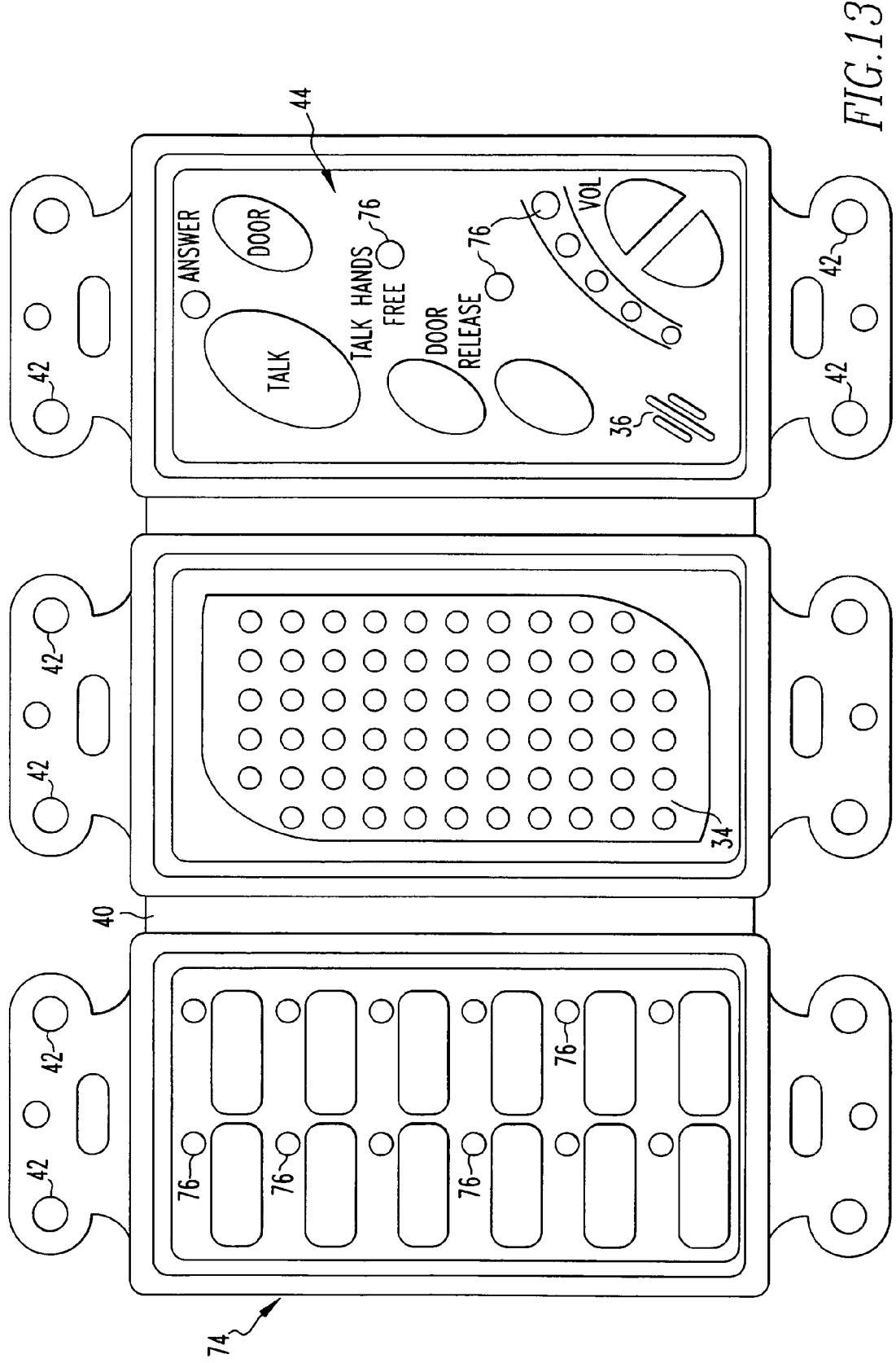
FIG. 13 is a front view of a remote user interface unit as a central control unit of a distributed intercom system according to the present invention.

FIG. 13 illustrates one preferred embodiment of the central control unit 46 (as a remote user interface unit 30). This central control unit 46 is configured for placement in connection with a three-gang decorator opening 100, and the speaker device 34, microphone device 36, control interface elements 44 and status indicators 76 are provided. The control interface elements 44 (and associated status indicators 76) provide for the above-discussed "talk", "door", "talk hands free", "door release" and "volume control" functions. Additionally, this central control unit 46 also includes the display portion 74 with status indicators 76 that indicate status or state of various other units 30. As seen in this embodiment, the status indicators 76 are LEDs, and are associated with a portion that the user can apply a label or otherwise identify and associate the status indicator 76 with.

Figure 14:
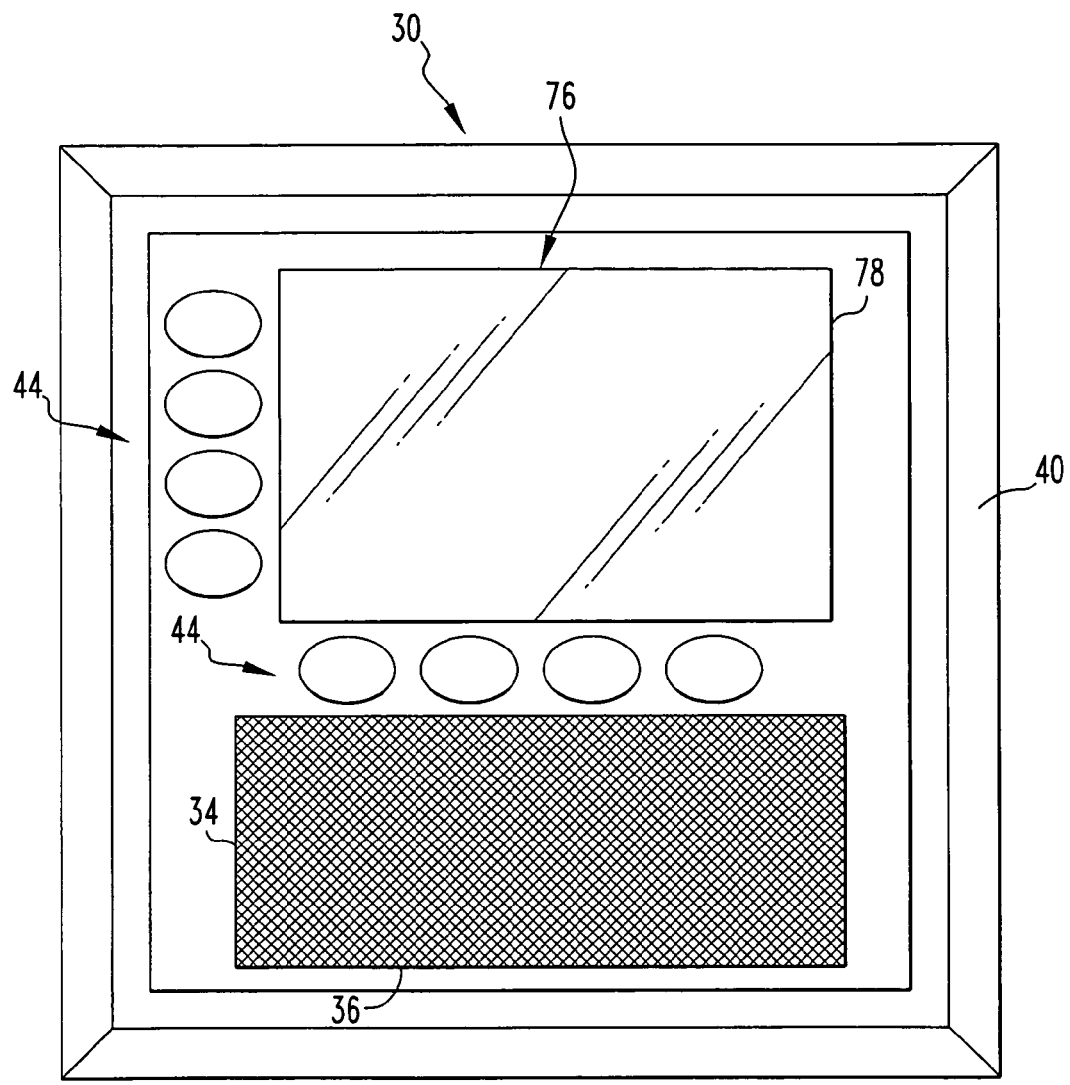
FIG. 14 is a front view of a remote user interface unit as a central control unit of a distributed intercom system according to the present invention.

FIG. 14 illustrates one preferred structure of a central control unit 46 that provides a display screen 78 as the status indicators 76. In addition, in this embodiment, the display screen 78 is interactive, and allows the user to depress or otherwise interact with the various control interface elements 44 to achieve certain functionality. For example, such an arrangement can be used for the "selective call" feature allowing communication between the various remote user interface units 30, the centralized interconnection unit 12, the central control unit 46, external systems 50, etc.

Figure 15:
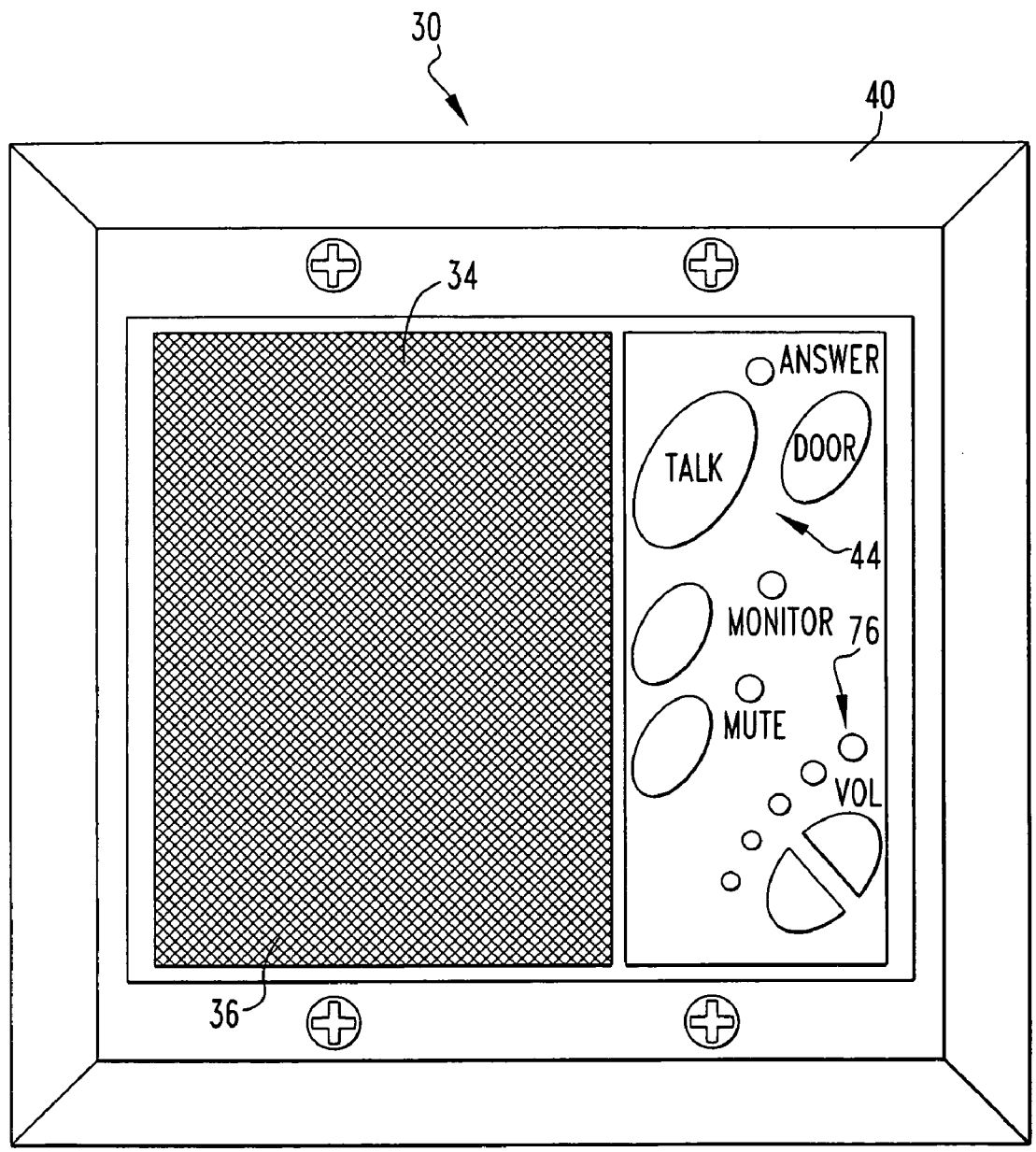
FIG. 15 is a front view of a remote user interface unit for use as a patio unit of a distributed intercom system according to the present invention.

FIG. 15 illustrates one preferred structure and arrangement of a remote user interface unit 30, such as one that can be used as the above-discussed patio unit. As seen in this figure, the various features, including "talk", "door", "monitor", "mute", and "volume control" are provided. However, the speaker device 34 is larger than the in-house speaker devices 34. In addition, this patio unit 30 can be attached to the wall of the structure. The use of a larger speaker device 34 provides for better sound and projection capabilities.

Figure 16:
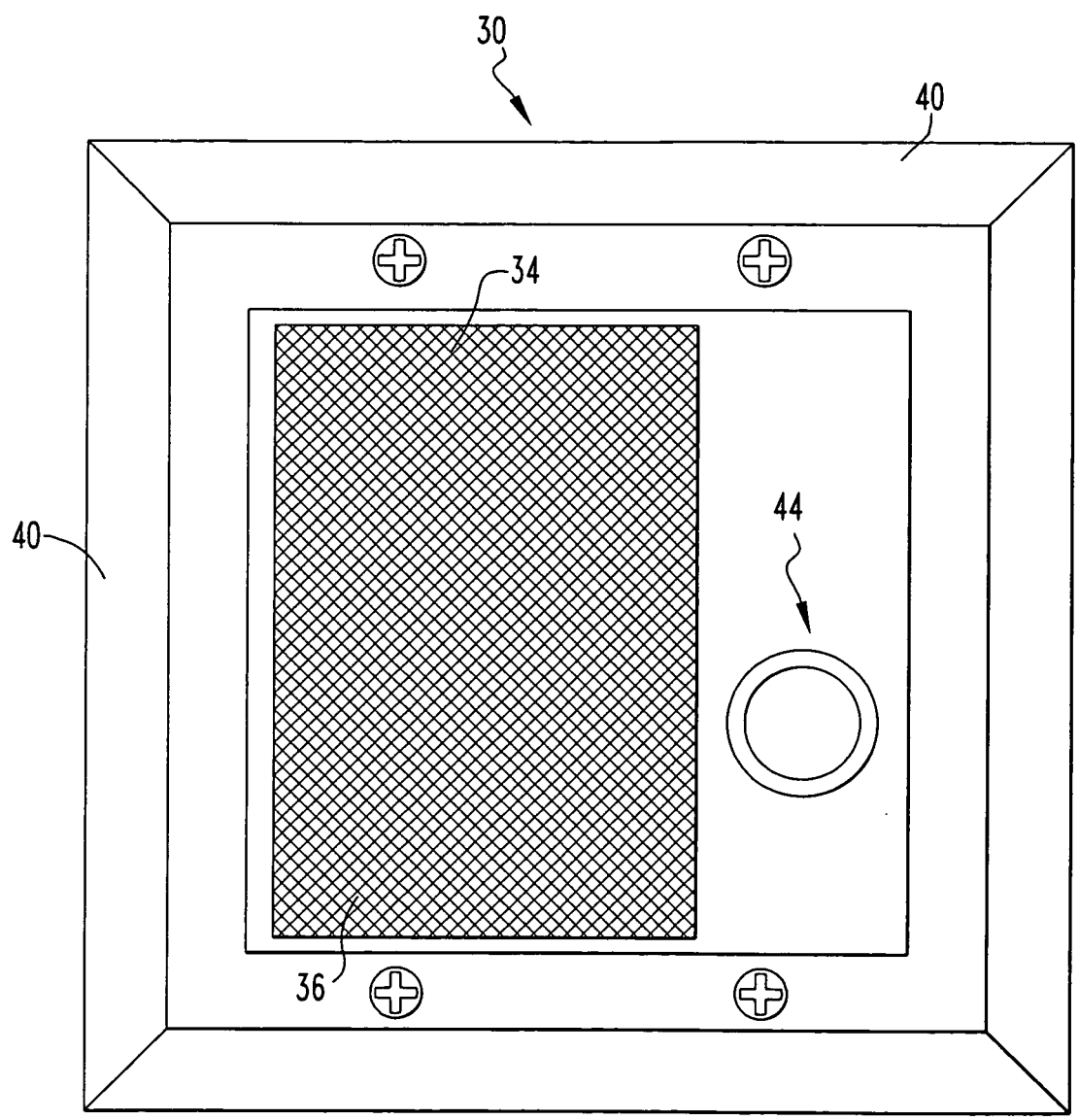
FIG. 16 is a front view of a remote user interface unit for use as a door unit in a distributed intercom system according to the present invention.

FIG. 16 is one preferred structure and arrangement of a remote user interface unit 30 for use as the above-discussed door unit. As seen in this figure, only one button or control interface element 44 is provided, and actuation of this button provides some tone or audio indication that activation has occurred. As with the patio unit, the door unit 30 includes a larger speaker device 34, and the enclosure 40 can be attached to the wall of the home. When used in connection with the audio interrupt module 92, depression of the button mutes any connected audio source, such that the user can hear the alarm, tone, doorbell or similar audio indication of activity.

Figure 17:
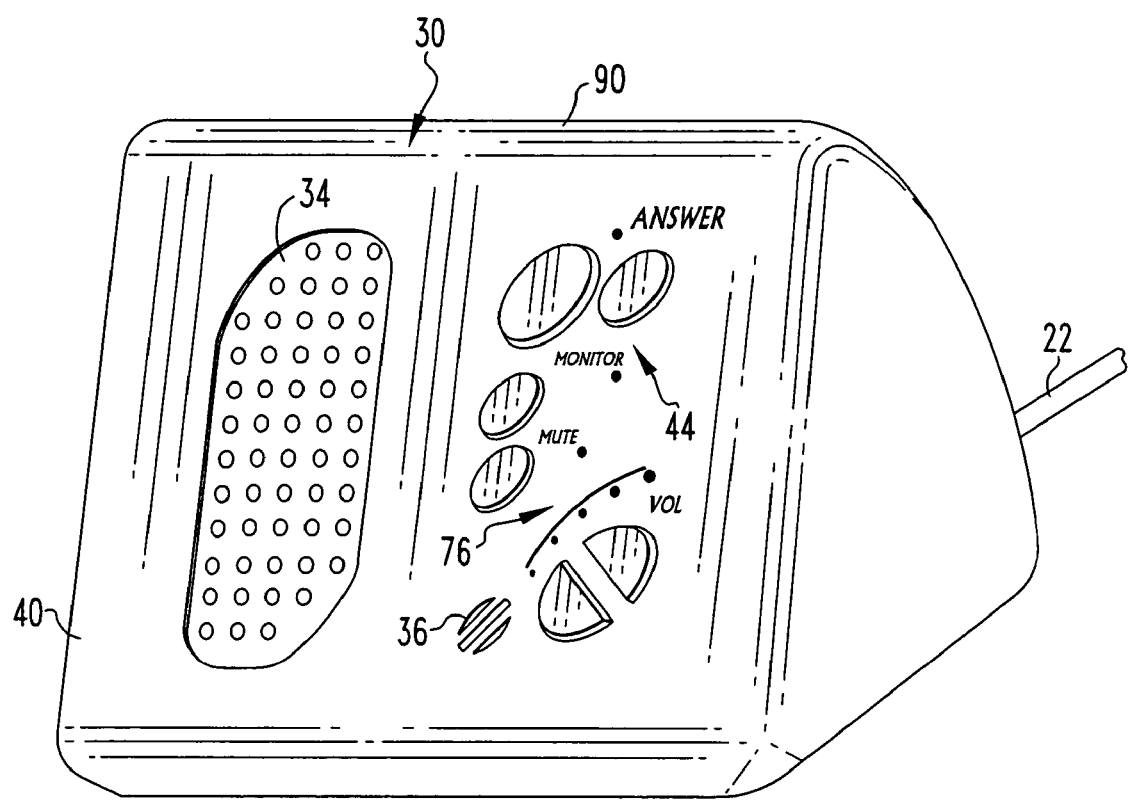
FIG. 17 is perspective view of a standalone remote user interface unit of a distributed intercom system according to the present invention.

FIG. 17 illustrates one preferred structural arrangement of the standalone unit 90. This standalone unit 90 includes the same features and functions as discussed in connection with the two-gang remote user interface unit 30 illustrated in FIG. 12. However, the enclosure 40 of the standalone unit 90 is a housing that allows for placement of the standalone unit 90 on a flat surface.

In this manner, the present invention provides a distributed intercom system 10 that provides additional functionality and distribution characteristics. The distributed intercom system 10 may communicate using Category-type wiring, such as CAT 5 wiring or cabling and the like. In addition, in one embodiment, the distributed intercom system 10 provides a line-level, analog audio signal 28, which is amplified by the amplifier 32 at each remote user interface unit 30. Such amplification at the "remote" zone obviates any degradation in the signal that is broadcast. In addition, the amplifier 32, speaker device 34, microphone device 36 and other components at the remote user interface unit 30 can be powered over the cable 22 using the power signal 18 distributed from the power distribution device 16.

In addition, the present invention provides a distributed intercom system 10 that includes a central control unit 46 and/or centralized interconnection unit 12 that can indicate activities, states and functions of the various remote user interface units 30, as well as external systems 50 that are in communication therewith. Accordingly, the distributed intercom system 10 also provides a distributed audio system that can be integrated with other installed systems, such as communication and sound systems. Still further, the present invention provides a distributed intercom system 10 that includes remote user interface units 30 that are easily integratable with and attached within a standard decorator-type opening 100 in a wall.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A distributed intercom system, comprising:
   a centralized interconnection unit including: (i) a central control device configured to receive, process and transmit signals; (ii) a power distribution device configured to transmit a power signal for distribution; and (iii) at least one cable connection port configured to receive a cable connection therein;
   at least one cable having a cable connection element configured for connection to the cable connection port, the cable further configured to transmit a control signal, a line-level, analog audio signal and the power signal; and
   at least one remote user interface unit connected to and in communication with the centralized interconnection unit through the at least one cable, the at least one remote user interface unit including: (i) an amplifier configured to amplify the line-level analog audio signal and provide an amplified audio signal; (ii) a speaker device configured to output the amplified audio signal; and (iii) a microphone device configured to receive audible input and generate an audio input signal;
   wherein at least one component of the remote user interface unit is powered at the remote user interface unit by the power signal transmitted by the power distribution device of the centralized interconnection unit.

2. The system of claim 1, wherein the cable is Category-type cable, CAT 3 cable, CAT 5 cable, CAT 5E cable, CAT 6 cable or any combination thereof.

3. The system of claim 1, wherein the remote user interface unit includes an enclosure for at least partially housing the amplifier, the speaker device and the microphone device, the enclosure sized and shaped so as to fit into: (i) a one-gang decorator opening; (ii) a two-gang decorator opening; (iii) a three-gang decorator opening, or any combination thereof.

4. The system of claim 1, wherein the remote user interface unit includes an enclosure for at least partially housing the amplifier, the speaker device and the microphone device, the enclosure configured as a standalone, portable unit for positioning upon a substantially flat surface.

5. The system of claim 1, wherein the remote user interface unit includes at least one control interface element configured to permit a user to engage in a distributed control function at the remote user interface unit through interaction with the at least one control interface element.

6. The system of claim 5, wherein the function is a monitor function, a mute function, a selective call function, a broadcast function, a telephone answering function, a call function, a call function across a network, a call function to another remote user interface unit, a call function to the centralized interconnection unit, a call function to another centralized interconnection unit, a door activation function, a volume control function, a hands-free talk function, or any combination thereof.

7. The system of claim 1, wherein the centralized interconnection unit includes at least one control interface element configured to permit a user to engage in a control function at the centralized interconnection unit through interaction with the at least one control interface element.

8. The system of claim 1, wherein the centralized interconnection unit further comprises at least one external system connection port for communication with an external system, thereby facilitating communication between the centralized interconnection unit and the external system.

9. The system of claim 8, wherein the external system is a telephone system, an audio system, a security system, a network, an external telephone system, an internal telephone system, a home automation system, a video system, or any combination thereof.

10. The system of claim 8, wherein the external system is an audio system, the central control device of the centralized interconnection unit configured to communicate with and mute an audio signal emanating from the audio system when a specified condition arises.

11. The system of claim 8, wherein the external system is a network, the central control device of the centralized interconnection unit configured to communicate with a system over the network.

12. The system of claim 11, wherein the external system is a telephone system, an audio system, a security system, another network, an external telephone system, an internal telephone system, a home automation system, a remote user interface unit, another centralized interconnection unit, a remote user interface unit in communication with another centralized interconnection unit, a system module, or any combination thereof.

13. The system of claim 1, wherein the remote user interface unit is in the form of a telephone handset.

14. The system of claim 13, wherein the handset is operable through existing telephone wiring, which is in communication with the centralized interconnection unit.

15. The system of claim 1, wherein the centralized interconnection unit, the remote user interface unit, or any combination thereof, includes an enclosure having a display portion with at least one status indicator configured to visually display the status of the remote user interface unit, the status of the centralized interconnection unit, a function of the remote user interface unit, a function of the centralized interconnection unit, a state of the remote user interface unit, a state of the centralized interconnection unit, the status of an external system, a function of the external system, a state of the external system, or any combination thereof.

16. The system of claim 1, wherein the remote user interface unit includes an enclosure for at least partially housing the amplifier, the speaker device and the microphone device, the enclosure having a display portion with at least one status indicator configured to visually display the status of the remote user interface unit, a function of the remote user interface unit, a state of the remote user interface unit, the status of another remote user interface unit, a function of another remote user interface unit, a state of another remote user interface unit, or any combination thereof.

17. The system of claim 1, further comprising a plurality of remote user interface units in communication with the centralized interconnection unit via a corresponding and respective cable and cable connection port.

18. The system of claim 17, wherein at least one of the plurality of remote user interface units is a central control unit in communication with the other remote user interface units via the centralized interconnection unit.

19. The system of claim 1, wherein the central control device comprises control circuitry and configurable firmware configured to provide for the programmable control of the central control device, the remote user interface unit, or any combination thereof.

20. The system of claim 1, wherein the centralized interconnection unit, the remote user interface unit, or any combination thereof include an audio recording device, an audiovisual recording device, a visual recording device, a video capture device, a digital recording device, a monitoring device, a temperature monitoring device, a weather monitoring device, a state monitoring device, or any combination thereof.

21. The system of claim 20, wherein the centralized interconnection unit, the remote user interface unit, or any combination thereof is in communication with a video display system configured to visually display data obtained from the centralized interconnection unit, the remote user interface, or any combination thereof.

22. The system of claim 1, wherein the centralized interconnection unit, the remote user interface unit, or any combination thereof includes radio frequency filter circuitry configured to substantially eliminate electromagnetic field coupling from radio frequency transmitters.

23. The system of claim 1, wherein the component powered is the amplifier, the speaker device, the microphone device, a component positioned at the remote user interface device, a control interface element, a display, an audio recording device, an audiovisual recording device, a visual recording device, a video capture device, a digital recording device, a monitoring device, a temperature monitoring device, a weather monitoring device, a state monitoring device, or any combination thereof.

* * * * *